United States Patent [19]
Liska et al.

[11] Patent Number: 4,892,430
[45] Date of Patent: Jan. 9, 1990

[54] QUICK CONNECT-DISCONNECT DRIVE SHAFT COUPLING

[75] Inventors: Miroslav Liska, Northridge; Anthony Tomsicek, Woodland Hills, both of Calif.

[73] Assignee: Durotech Co., Moorpark, Calif.

[21] Appl. No.: 270,047

[22] Filed: Nov. 14, 1988

[51] Int. Cl.4 ................................................ F16B 1/00
[52] U.S. Cl. ........................................ 403/24; 403/14; 403/337; 403/335
[58] Field of Search ............... 403/335, 336, 337, 338, 403/24, 13, 14

[56] References Cited
U.S. PATENT DOCUMENTS
2,712,741 7/1955 Roller .............................. 403/337 X Primary Examiner—Andrew V. Kundrat
Attorney, Agent, or Firm—Harlan P. Huebner

[57] ABSTRACT

A quick connect-disconnect coupling for joining two drive shafts on a common axis for simultaneous movement where one drive shaft extends from a prime mover and the other from a piece of equipment. The coupling includes a first mating member mounted on one of the drive shafts that has socket means and drive pin means, and a second mating member on the other of said drive shafts that has a ball member matable with said socket and pin engaging means to receive said pins which when said pins are rotated will impart rotation to the first mating member for simultaneous rotation.

18 Claims, 2 Drawing Sheets

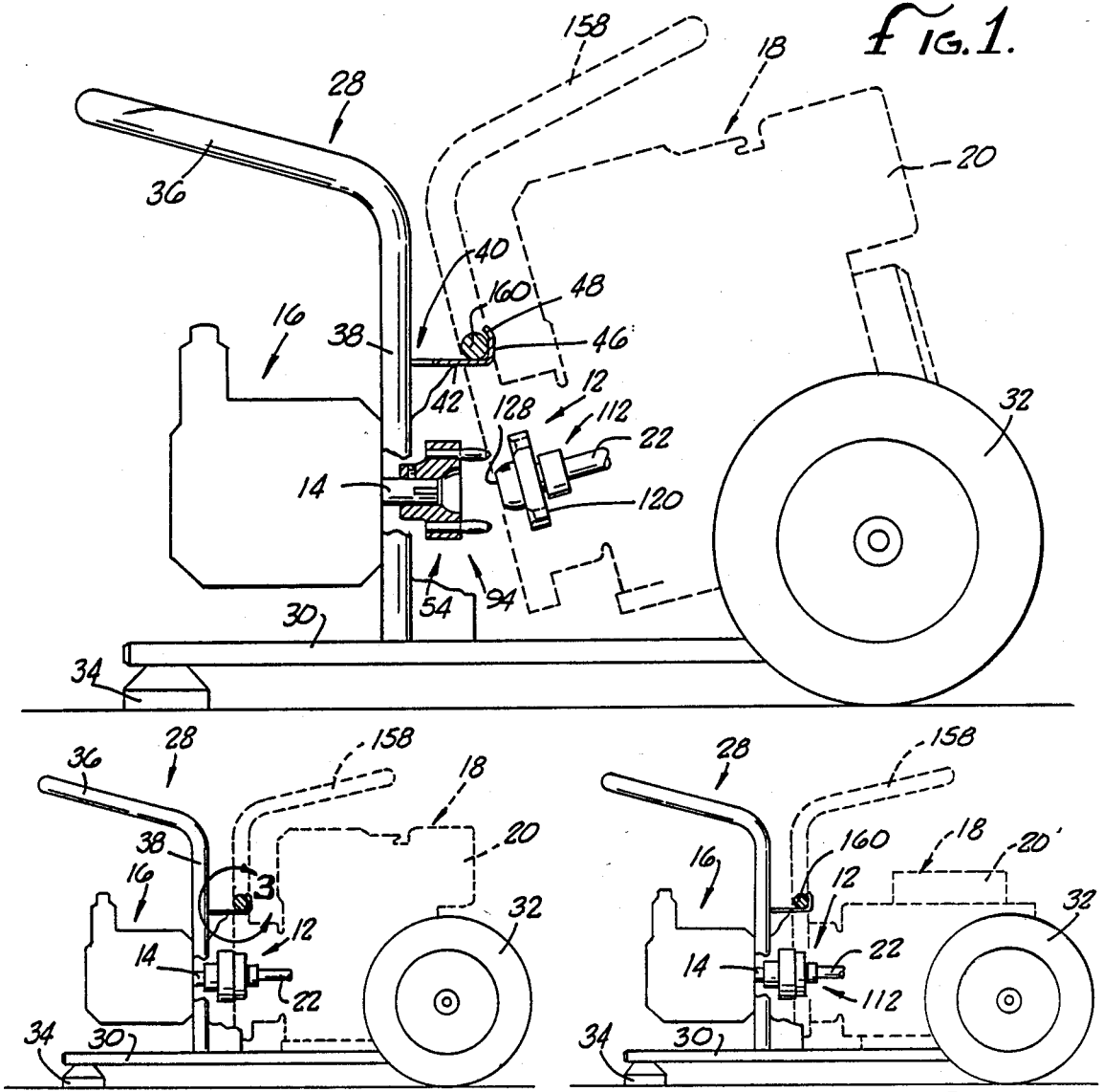
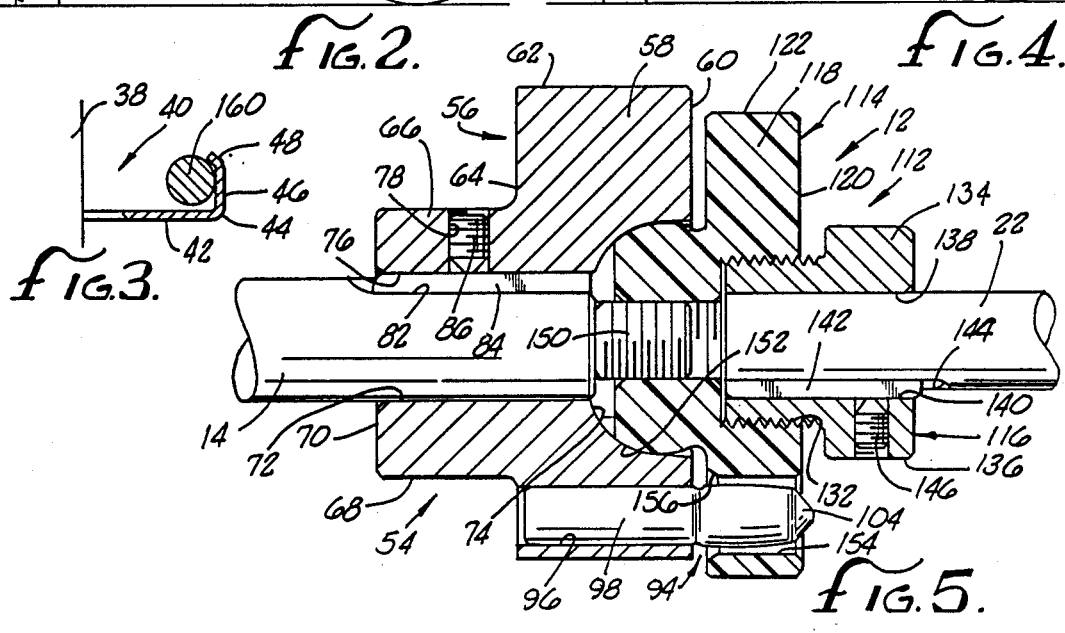

QUICK CONNECT-DISCONNECT DRIVE SHAFT COUPLING

BACKGROUND OF THE INVENTION

1. Field of the Invention.

This invention relates to a quick connect-disconnect drive shaft coupling for use in uniting two drive shafts on common movement for simultaneous movement.

2. Description of the Prior Art.

With the advent of portable airless paint sprays and other portable equipment utilizing a pump it often times becomes necessary to change the prime mover which is usually an electric or gasoline motor. Particularly is the change necessary if the equipment is being used in an area not yet equipped with electricity then the operator would need to fit the equipment with a gasoline motor. On the other hand with our U.S. electrical standard of 120 volts an electric motor may not give sufficient power for proper operation. Furthermore, if the spray equipment is to be used inside a structure an electric motor is needed.

In the past where there was a prime mover such as an electric motor or small gasoline powered motor to be used with an item such as a portable paint pump associated with an airless paint spray or other portable equipment, a common single shaft was used. In order to change from one form of motor to another it would be necessary to dismantle either the pump or engine and then install the common shaft. This was cumbersome and very time consuming.

With the event of pulley drives there was a pulley attached to the drive shaft of a motor and also one attached to the drive shaft of the paint pump. The pulleys were united by a drive belt. In order to change engines it was necessary to dislodge the drive belt from one or both drive shafts, remove the motor, align a new motor and place the belt back on the pulleys. This again was cumbersome and time consuming.

In view of the prior art coupling structures there is a need for a fast, efficient, self-centering connect-disconnect drive shaft coupling.

SUMMARY OF THE INVENTION

It is an object of the present invention to provide a quick connect-disconnect coupling for uniting the drive shaft of a prime mover to a paint pump or other equipment operating off of a drive shaft.

Another object of the present invention is to provide a coupling that includes connecting portions which are self aligning.

A still further object of the present invention is to provide a coupling that includes positive contact portions to assure shaft rotation.

Another object of the present invention is to provide a coupling that includes a socket member and engagement means mounted on the drive shaft of a pump or other equipment and a ball drive member mounted on the drive shaft of a prime mover that includes means to receive said engagement means to impart rotation.

A yet another object of the present invention is to provide a two part coupling that when the two parts are moved to engagement they are self centering to prevent drive shaft misalignment.

A further advantage is to provide a coupling so that one prime mover may be used with several pieces of equipment without the necessity of buying an engine for each element piece of equipment.

Another object of the present invention is to provide a coupling that may be quickly disconnected so that the prime mover may be moved to another place where it may be coupled to run another piece of equipment other than that from which it was disconnected.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which:

FIG. 1 is a side elevational view partially in section of the quick connect-disconnect coupling for uniting a prime mover and piece of equipment:

FIG. 2 is a side elevational view similar to FIG. 1 but with the coupling in locked relationship;

FIG. 3 is an enlarged sectional view taken on arrow line 3 of FIG. 2;

FIG. 4 is a sided elevational view similar to FIGS. 1 and 2 but with a different prime mover attached through the coupling to a piece of equipment;

FIG. 5 is an enlarged side elevational sectional view of the complete quick connect-disconnect coupling of the present invention;

DETAILED DESCRIPTION OF THE PREFERRED EMBODIMENT

Figure 7:
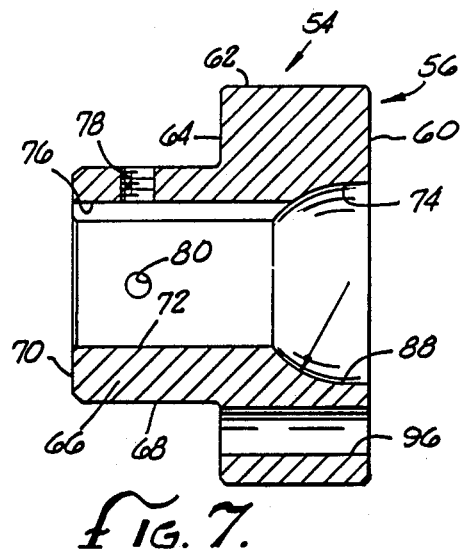
FIG. 7 is a side elevational sectional view of the portion of the coupling illustrated in FIG. 6.

Referring to FIG. 1 there is illustrated an environmental view of the quick connect-disconnect coupling general designated 12 secured to a conventional drive shaft 14 of a piece of equipment generally designated 16. The equipment 16 may be an item such as a paint pump to move paint to an airless paint spray or to a pressure washer machine to wash a surface for painting. In addition, without departing from the spirit of the invention the equipment 16 may also be any other form of equipment that includes a drive shaft to be rotated where there may be a need to change the power element to power the equipment.

Additionally, in FIG. 1 there is illustrated in dotted lines one form of a conventional prime mover generally designated 18 such as a relatively small one cylinder gasoline powered engine 20. The engine 20 also includes a drive shaft 22. In FIG. 4 the prime mover 18 in dotted lines is intended to represent an electric motor 20' preferably run off of electrical house current.

In the embodiment of FIGS. 1 through 4 there is preferably a cart or dolly generally designated 28 that includes a horizontal frame 30, a pair of wheels 32 mounted on the frame and a front rest 34. Extending upward from the frame 30 is a handle 36 to move the cart 28. As illustrated for sake of simplicity, the pump or equipment 16 is mounted to a vertical portion 38 of the handle element 36.

The cart 28 and pump or equipment 16 will then be moveable as a unit from place to place for use. In the situation where the equipment 16 is a paint pump the cart 28 may be wheeled from room to room or area to area so as to be near the paint spray.

The vertical portion 38 of the handle member 36 preferably includes a bracket member designated 40, see FIG. 3, projecting horizontally rearwardly from the equipment 16. The member 36 includes at least one horizontal bracket plate 42 that is bent normal thereto at bend 44 forming an upwardly extending extension 46 terminating in a forwardly bent end 48.

Turning now to the quick connect-disconnect coupling 12, FIG. 5 illustrates the respective elements in a united position and FIGS. 6 through 10 illustrate various elements thereof.

Figure 6:
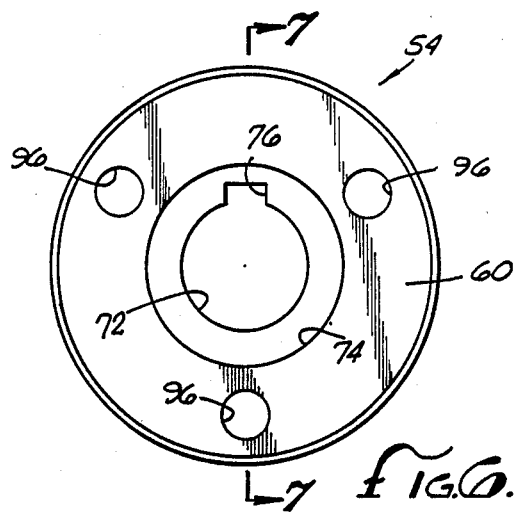
FIG. 6 is a front elevational view of a portion the quick connect-disconnect coupling of the present invention.

Mounted on the drive shaft 14 of the piece of equipment 16 is a first mating member or socket portion designated 54, see FIGS. 6 and 7. The member 54 preferably includes a coupling block 56 that has an enlarged annular cavity section 58 with a rear face 60, annular wall 62 and front face 64. Projecting forwardly from the front face 64 is a reduced diameter hub 66 having an annular wall 68 with a forward face 70.

Extending through the first mating member 54 is an axial bore 72 that moves from face 70 through the hub 66 into and communicating with an enlarged conical pocket opening 74 which in turn is formed inwardly from the face 60. Preferably the axial bore 72 and socket opening 74 communicate because of ease of manufacture. However, for operation of the invention it is not necessary that the bore and socket communicate.

The axial bore 72 is also preferably provided with a conventional axial key way 76 having a set screw bore 78 passing from wall 68 into locking key way 76. An additional set screw bore 80 extending from the wall 68 into the bore 72 may be provided to assure proper locking contact by a set screw (not shown) that is mounted in the bore 80 to bear against drive shaft 14 mounted in the axial bore 72.

In order to initially secure the drive shaft 14 in the socket portion 54 it is placed in the axial bore 72 to the desired length. The drive shaft 14 preferably includes a locking shim groove 82 and shim 84 that is seated in the groove 82 and projects into the key way 76. A set screw 86 is then tightened in the bore 78 to bear against the shim and inturn lock the drive shaft 14 in position on the block 56 and to prevent rotation. Another way of locking may be accomplished by providing a key raised from the surface of the drive shaft 14 which slides into the key way 76 and is blocked by a set screw.

The enlarged conical socket includes a ball bearing area 88 at the bottom thereof in the vicinity of the arrow point in FIG. 7.

Projecting rearwardly from the face 60 of socket portion 54 are coupling pins designated 94. In the illustrations there are three such pins 94 mounted in bores 96, in the coupling block 56, however, lesser or greater number may be used with equal effect.

Figure 10:
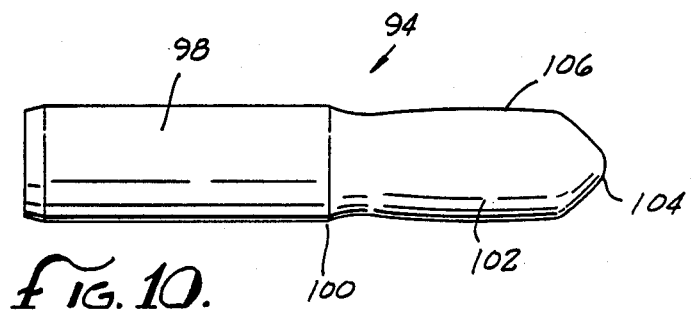
FIG. 10 is a side elevational view of a locking pin used in the present invention.

The coupling pins, see FIG. 10 each contain an elongated body portion 98 which is swedged or otherwise mounted in the bore 96. The body portion 98 terminates at the front edge 100 in a pin coupling portion 102 which includes a tapered end 104.

The annular surface 106 of pin coupling portion 102 is preferably bowed for ease of insertion to be described. Generally centrally located between the front edge 100 and tapered end 104 the thickness or diameter of the annular surface 106 is thicker and the surface 106 tapers to lesser diameters as the surface proceeds to the edge 100 and tapered end 104. However, the pin 94 could also have a common diameter through its length without departing from the spirit of the invention.

The coupling block 56 and coupling pins 94 may be formed from aluminum or any other metal sufficient to withstand wear during operation as a part of the quick connect-disconnect coupling.

Figure 9:
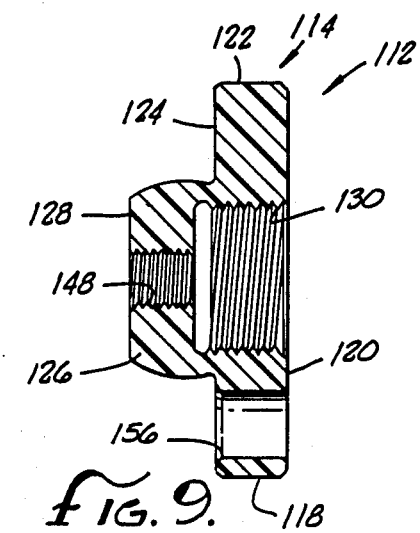
FIG. 9 is a side elevational sectional view of the portion of the coupling illustrated in FIG. 8.
Figure 8:
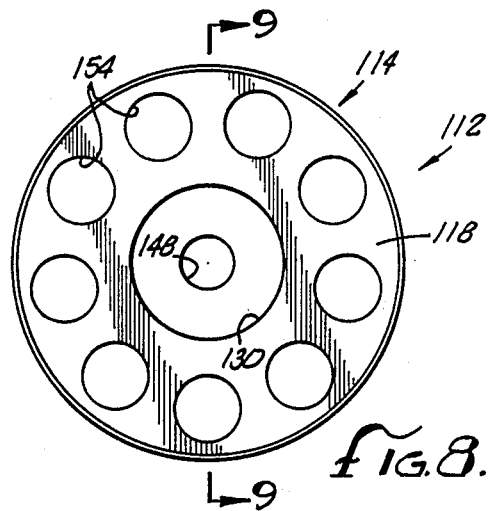
FIG. 8 is a front elevational view of another portion of the quick connect-disconnect coupling of the present invention.

Mounted on the drive shaft 22 of the prime mover 18 is a second mating drive member or ball portion designated 112 of the quick connect-disconnect coupling, see FIGS. 8 and 9. The second mating drive member 112 includes two parts, the annular ball and driver front member 114 and a hub 116 which is threadable mounted in the member 114. It is preferred that there be two members, namely, 114 and 116 and that the ball and driver front member designated 114 be of Teflon or other heavy duty plastic capable of extending use and the hub designated 116 be of steel or other appropriate metal. However, without departing from the spirit of the invention the second mating driver member 114 could be a single piece and also it could be constructed of all metal or all plastic.

The annular ball and driver front member 114 includes an annular driver plate 118 that has a flat rear face 120, an annular wall 122 and a flat front face 124 parallel with face 120. Projecting forwardly from face 124 is an annular bearing ball extension 126 of a diameter less than the diameter of the annular driven plate 118 and terminating in a front flat face 128.

Extending inwardly from flat rear face 120 is a threaded bore 130 to threadably receive a threaded shank 132 of hub 116. The 116 also includes an enlarged annular section 134 which has an annular wall 136. The section 134 and shank 132 have a drive shaft receiving bore 138 extending therethrough. As can be seen in FIG. 5 the bore 138 includes a conventional key slot 140 which receives a shim 142 that is set into a shim groove 144 in the drive shaft 22. A set screw 146 extending in from annular wall 136 is tightened to lock the hub 116 on the shaft 22.

In turn the front member 112 is threaded onto the shank 132 in threaded opening 130.

Extending inward from front flat face 128 is horizontal threaded adjustment bore 148 that receives horizontal adjustment set screw 150. This set screw 150 is adjusted inward or outward of the face 128 so that the annular bearing and alignment ball extension 126 will mate properly with the conical socket opening 74. As can be seen from the drawings the curved contours of both the socket 74 and bearing ball 126 are complementary. It is desirable that the bearing ball 126 in the area 152 be as complementary as possible with the surface of the bearing area 88 of the socket 74. The reason for this will be explained.

The annular driver plate 118, see FIGS. 5, 8 and 9 is provided with a number of pin receiving driver bores 154 of a diameter preferably greater than the largest diameter of the annular surface 106 of the pins 94 for a sloppy fit. In addition, there is an annular chamfer 156 at the front of the driver bores 154 to act as guides for the pins 94.

It should also be recognized that the first and second mating members 54 and 112 may be reversely mounted on either drive shaft and operate without departing from the spirit of the invention.

Finally, the prime mover 20 may be mounted on a frame 158 shown in dotted lines for ease of installation. In addition, the frame 158 preferable includes a pivot bar 160 that may be hooked over the bracket member 40 to pivot the prime mover 20 into or out of position.

In operation, with the pump or piece of equipment 16 mounted on the cart 28, the frame 158 containing the prime mover 20 is lifted whereby the pivot bar 160 rests on the bracket member 40 behind the extension 46 and under the bent end 48. The prime mover 20 may be shifted on the bracket 40 so that the ball and driver front member 114 are in general alignment with the first mating member or socket portion 54.

The frame 158 is then pivoted downward on the bracket 40 so that the bearing ball extension 126 contacts the socket opening 74. As the bearing ball 126 moves into the socket 74 by continued pivot movement it will self align itself with the socket as long as there is a relatively close general alignment. Continued pivot movement of the frame 158 will lodge the ball 126 within the socket as shown in FIG. 5. The spacing between the ball 126 and the pivot bar 160 of the frame 158 and the position of the bracket is such that the pivot bar 160 is actually raised off of the bracket plate 42 as illustrated in FIG. 3. The pivot bar 160 will still bear against the extension 46 and bent end 48 for stability, but no weight of the prime mover 20 is resting or bearing on the horizontal plate 42.

At the point of coupling, the entire weight of the prime mover 20 is now bearing through the ball 126 in the area 152 on the bearing area 88 of the socket. The sustaining of the weight of the bearing area 88 is desirable so that there is an even distribution of weight on the coupling pins 94 when contacted by the bores 154 into which the pins have moved as the coupling takes place.

With the plurality of bores 154 and the relatively small area between bores there will be assured an alignment and a mating of the pins with the bores because the tapered ends 104 of the pins will move causing the block 56 to rotate and seek the bores 154. Also with the chamfers 156 additional guiding alignment is possible.

Once the pins 94 are within the bores as is seen in FIG. 5 the prime mover 20 may be activated rotating the second mating member 112 through rotation of the drive shaft 22. As the member 112 rotates the sides of the bores 154 engage the annular surfaces 106 of the pins and impart rotation to the pins and in turn the first mating member or socket portion 54 and the drive shaft 14.

As the coupling 12 is rotated by the prime mover drive shaft 22 there will always be the weight support at the bottom of the socket 74 and the bottom of the ball 126 as both rotate simultaneously. This in turn will distribute the pinbore contact to assume smooth unitary rotation.

The purpose of the arc or curved annular surface 106 of the pins 94 is to further assure that no binding occurs between the pins and bores. In other words the pin contact with the bore 154 is only at the limited high area of the bowed or curved surface 106 so that there is less surface contact than if the pin was straight and there was full surface contact. The aforedescribed is the optimum, however, the coupling will still work if the pins 94 are straight sided.

When it is desired to change the form of prime mover 20 from gasoline powered to electrical because the new use of the equipment such as a paint pump 16 is inside a building, the frame 158 only needs to be pivoted dislodging the ball from the socket and pins.

While the preferred embodiment shows a prime mover mounted on a frame and the entire assembly on a cart for portability, it must be realized that the frame and cart are not necessary to accomplish the intended coupling of two drive shafts.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. We do not wish to be restricted to the specific forms shown or uses mentioned, except as defined in the accompanying claims, wherein various portions have been separated for clarity of reading and not for emphasis.

We claim:

1. A quick connect-disconnect coupling adapted to unite on a common axis a first drive shaft of a prime mover with a second drive shaft of a piece of equipment for common rotation of said shafts comprising:
    a first mating member mounted on one of said shafts, said first mating member including a socket portion and a first interlockable drive means which includes at least one side biasing, axially nonfastenable driver pin fixedly secured thereto and a part thereof projecting generally parallel to said common axis; and
    a second mating member mounted on the other of said shafts, said second mating member including a ball portion removable matable with said socket portion for aligning said shafts and a second interlockable drive means matable with said first interlocking drive means in which said second interlocking drive means includes a driver bore to releasably receive said side biasing, axially non-fastening driver pin whereby movement of one of said shafts will impart movement through said first and second interlockable drive means when said mating members are biasingly engaged one with the other and movement of one of said shafts will impart movement through said interlocking drive means to said other drive shaft.

2. A quick connect-disconnect coupling as defined in claim 1 wherein:
    said first mating member is mounted on the drive shaft of said piece of equipment; and
    said second mating member is mounted on the drive shaft of said prime mover which imparts movement to said second drive shaft when activated.

3. A quick connect-disconnect coupling as defined in claim 1 wherein:
    said first mating member includes an annular hub and enlarged annular socket section, said socket section has a rear generally flat face opposite said hub and an arcuate socket extending inwardly from said face, said hub includes a drive shaft bore to receive and be fixed onto one of said drive shafts, and said first interlockable drive means includes a plurality of driver pins projecting from said generally flat face;

said second mating member includes a annular drive plate and a bearing ball portion of an arcuate configuration complementary with at least a portion of said arcuate socket, said driver plate includes a plurality of pin receiving driver bores radially spaced around said plate and passing therethrough parallel to the common axis of said drive shafts, whereby when pressure is axially asserted on said mating member said ball will be forced into said pocket and said pins pass into said driver bores.

4. A quick connect-disconnect coupling as defined in claim 3 wherein:
said second mating member has a rear generally flat face and includes a hub secured through said generally flat face in said annular driver plate on the opposite side from said bearing ball portion, said hub includes a drive shaft bore to receive and be fixed onto the other of said drive shaft.

5. A quick connect-disconnect coupling as defined in claim 3 wherein:
each of said pin receiving driver bores have a diameter greater than the diameter of said pins to assure ease of entry of said pins.

6. A quick connect-disconnect coupling as defined claim 3 wherein:
the driver pins are annular and each includes a tapered end and an arcuate annular wall from said end to said generally flat face wherein a portion intermediate said end and generally flat face is of the greatest diameter.

7. A quick connect-disconnect coupling as defined in claim 3 wherein:
said annular socket section includes a lower arcuate bearing surface; and
said bearing ball portion includes a lower arcuate bearing surface which assumes the load bearing of the prime mover when the ball and socket are interconnected whereby there is an equal distribution of weight of said enlarged annular socket section so that the positioning of said driver pins are evenly distributed when each are in said driver bores.

8. A coupling system for joining a pair of drive shafts for common axial in-line rotation comprising:
a frame including a handle portion rising from said frame and including a pivot bracket elevated above said frame;
a pump means including a drive shaft, said drive shaft projecting from said pump and having a horizontal axis and said pump means mounted on said frame;
a first mating member mounted on said pump shaft, said member including a socket portion and first interlockable drive means;
a removable prime mover including the other of said drive shafts projecting from said prime mover;
a second mating member mounted on said prime mover shaft, said member including a ball matable with said socket and a second interlockable drive means matable with said first interlocking drive means;
a prime mover frame upon which said prime mover is mounted, said frame including a pivot frame member elevated above said prime mover drive shaft whereby when said pivot member is mounted on said pivot bracket said prime mover may be pivoted downwardly for fictional engagement of said first and second mating members and said first and second interlockable drive means so that rotation of said prime mover drive shaft will impart rotation through said coupling to said pump drive shaft, and by pivoting said prime mover away from said pump disconnecting said coupling for removal of the prime mover.

9. A coupling system as defined in claim 8 wherein:
said first mating member includes an annular hub and enlarged annular socket section, said socket section has a rear generally flat face opposite said hub and a conical socket extending inwardly from said face, said hub includes a drive shaft bore to receive and be fixed onto one of said drive shafts, and said first interlockable drive means includes a plurality of driver pins projecting from said generally flat face;
said second mating member includes an annular driver plate and bearing ball portion of a conical configuration complementary with at least a portion of said conical socket, said drive plate includes a plurality of pin receiving driver bores radially spaced around said plate and passing therethrough parallel to the common axis of said drive shafts, whereby when pressure is axially asserted on said mating member said ball will be forced into said pocket and said pins pass into said driver bores.

10. A coupling system as defined in claim 9 wherein:
said second mating member has a rear generally flat face and includes a hub secured through said generally flat face in said annular driver plate on the opposite side from said bearing ball portion, said hub includes a drive shafts bore to receive and be fixed onto the other of said drive shaft.

11. A coupling system as defined in claim 10 wherein:
said annular socket section includes a lower arcuate bearing surface; and
said bearing ball portion includes a lower arcuate bearing surface which assumes the load bearing of the prime mover when the ball and socket are interconnected whereby there is an equal distribution of weight of said enlarged annular socket section so that the positioning of said driver pins are evenly distributed when each are in said driver bores.

12. A coupling system as defined in claim 9 wherein:
each of said pin receiving driver bores have a diameter greater than the diameter of said pins to assure ease of entry of said pins.

13. A coupling system as defined in claim 9 wherein:
the driver pins are annular and each includes a tapered end and an arcuate annular wall from said end to said generally flat face wherein a portion intermediate said end and generally flat face is of the greatest diameter.

14. A friction coupling to quickly connect or disconnect a drive shaft having an end of a power unit with the drive shaft having an end of a pump where the respective drive shafts in operating position are axially aligned comprising:
a first mating member including a hub portion and a socket portion having a conical socket cavity, a drive shaft bore extending through said hub communicating with said conical socket cavity, said bore receiving said drive shaft of said pump with said end of said shaft projecting toward said conical socket cavity, a plurality of drive pins projecting from said socket portion;
a second mating member including a hub portion, a driver disk and a truncated conical ball portion projecting from said driver disk opposite said hub, and frictionally insertable in said conical socket cavity, a drive shaft bore extending through said hub portion and said driver disk, said bore receiving said drive shaft of said power unit, a plurality of driver bores in said driver disk peripherally spaced therearound receiving said driver pins whereby upon rotation of said power unit drive shaft and driver bores engage said drive pins to simultaneously rotate said drive shaft of said pump.

15. A friction coupling as defined in claim 14 wherein:
said truncated conical ball portion includes adjustment means to position said ball portion in said conical socket cavity where there is intimate bearing contact between the lower portion of said cavity and said ball.

16. A friction coupling as defined in claim 15 wherein:
said adjustment means includes a set screw projection from said truncated conical ball portion to engage said end of said drive shaft of said pump.

17. A quick connect-disconnect coupling adapted to unite on a common axis a first drive shaft of a prime mover with a second drive shaft of a piece of equipment for common rotation of said shafts comprising:
a first mating member mounted on one of said shafts, said first mating member includes an annular hub and enlarged annular socket section, said socket section has a rear generally flat face opposite said hub and an arcuate socket extending inwardly from said face, said hub includes a drive shaft bore to receive and be fixed onto one of said drive shafts, and a first interlockable drive means which includes at least one driver projecting from said generally flat face;
a second mating member mounted on the other of said shafts, said second mating member includes an annular drive plate and a bearing ball portion of an arcuate configuration complementary with at least a portion of said arcuate socket, said drive plate includes at least one pin receiving driver bore parallel to said common axis of said drive shafts, whereby when pressure is axially asserted on said mating member said ball will be forced into said socket and said pin passes into said driver bore and movement of one of said shafts will biasingly impart movement through said interlocking drive means to said other drive shaft.

18. A quick connect-disconnect coupling as defined in claim 17 wherein:
said prime mover is an internal combustion engine; and
said piece of equipment is a pump.

* * * * *